(12) United States Patent
Leber

(10) Patent No.: US 10,320,951 B2
(45) Date of Patent: Jun. 11, 2019

(54) SYSTEMS AND METHODS FOR ESTABLISHING A VIRTUAL LOCAL AREA NETWORK

(75) Inventor: Mike Leber, Fremont, CA (US)

(73) Assignee: Hurricane Electric, Fremont, CA (US)

( * ) Notice: Subject to any disclaimer, the term of this patent is extended or adjusted under 35 U.S.C. 154(b) by 0 days.

(21) Appl. No.: 13/286,143

(22) Filed: Oct. 31, 2011

(65) Prior Publication Data

US 2013/0111002 A1    May 2, 2013

(51) Int. Cl.
G06F 15/16    (2006.01)
H04L 29/06    (2006.01)
H04W 4/50    (2018.01)

(52) U.S. Cl.
CPC .............. *H04L 69/08* (2013.01); *H04L 69/18* (2013.01); *H04W 4/50* (2018.02)

(58) Field of Classification Search
CPC ......... H04L 69/08; H04L 69/18; H04L 69/16; H04L 29/12358; H04L 61/251; H04W 48/18; H04W 4/001; H04W 4/50
USPC ................ 709/217, 223, 230, 238, 245, 227
See application file for complete search history.

(56) References Cited

U.S. PATENT DOCUMENTS

| | | | |
|---|---|---|---|
| 5,774,869 A | 6/1998 | Toader | |
| 6,215,412 B1 * | 4/2001 | Franaszek | G06F 13/4022 340/2.81 |
| 6,505,240 B1 * | 1/2003 | Blumenau | H04L 67/2804 709/201 |
| 6,532,450 B1 | 3/2003 | Brown et al. | |
| 6,708,219 B1 * | 3/2004 | Borella | H04L 12/4633 709/230 |
| 6,757,255 B1 * | 6/2004 | Aoki | H04L 1/187 370/229 |
| 7,512,547 B2 | 3/2009 | Ash | |
| 7,644,171 B2 * | 1/2010 | Sturniolo | H04W 80/045 709/230 |
| 8,180,901 B2 * | 5/2012 | Bagepalli | H04L 63/166 709/227 |
| 8,255,323 B1 | 8/2012 | Casey et al. | |

(Continued)

OTHER PUBLICATIONS

Final Office Action, dated Nov. 13, 2012, U.S. Appl. No. 13/401,748, filed Feb. 21, 2012.

(Continued)

*Primary Examiner* — Michael Won
(74) *Attorney, Agent, or Firm* — Carr & Ferrell LLP

(57) ABSTRACT

Systems and methods for establishing a virtual local area network are provided herein. According to some embodiments, methods for establishing a virtual local area network include determining at least a first data protocol utilized by a first communications device via a registration server, the first communications device being communicatively coupled with at least a first network via the first data protocol version; determining at least a second data protocol utilized by a second communications device via the registration server, the second communications device being communicatively coupled with at least a second network via the second data protocol version; establishing a network connection between the first communications device and the second communications device; and converting data format of data exchanged between the first and second communications devices when the first data protocol differs from the second data protocol.

9 Claims, 5 Drawing Sheets

(56) References Cited

U.S. PATENT DOCUMENTS

| | | | |
|---|---|---|---|
| 8,402,153 B2* | 3/2013 | Friedman | H04L 65/602 709/228 |
| 8,990,956 B2 | 3/2015 | Leber | |
| 9,965,760 B2 | 5/2018 | Leber | |
| 2002/0012320 A1* | 1/2002 | Ogier | H04L 1/1614 370/252 |
| 2003/0135461 A1 | 7/2003 | Brown et al. | |
| 2003/0233455 A1* | 12/2003 | Leber | G02F 1/1339 709/226 |
| 2004/0133463 A1 | 7/2004 | Benderev | |
| 2005/0055319 A1 | 3/2005 | Monsen et al. | |
| 2005/0071219 A1 | 3/2005 | Kahlert et al. | |
| 2005/0273438 A1 | 12/2005 | Yen et al. | |
| 2006/0224509 A1 | 10/2006 | Walker et al. | |
| 2006/0256716 A1* | 11/2006 | Caci | H04L 49/90 370/229 |
| 2007/0104099 A1* | 5/2007 | Mutnuru | H04L 47/10 370/229 |
| 2007/0162746 A1* | 7/2007 | Kwon | H04L 29/12358 713/164 |
| 2007/0199043 A1* | 8/2007 | Morris | H04L 12/2838 725/143 |
| 2008/0109278 A1 | 5/2008 | Rao | |
| 2008/0162315 A1 | 7/2008 | Rampell et al. | |
| 2008/0162350 A1 | 7/2008 | Allen-Rouman et al. | |
| 2008/0304482 A1* | 12/2008 | Grassi | H04L 29/12358 370/389 |
| 2009/0016253 A1* | 1/2009 | Lewis | H04L 12/1836 370/312 |
| 2009/0037277 A1 | 2/2009 | Zuckerberg et al. | |
| 2009/0190586 A1* | 7/2009 | Kim | H04L 12/18 370/390 |
| 2009/0199070 A1* | 8/2009 | Haymes | H03M 5/06 714/757 |
| 2009/0248800 A1* | 10/2009 | Chu | H04L 29/12216 709/204 |
| 2009/0254984 A1* | 10/2009 | Nice | H04L 63/0485 726/11 |
| 2009/0327412 A1* | 12/2009 | Lepeska | H04L 67/101 709/203 |
| 2010/0077095 A1 | 3/2010 | Wong et al. | |
| 2010/0182145 A1* | 7/2010 | Ungari | G09B 29/10 340/539.13 |
| 2010/0312702 A1 | 12/2010 | Bullock | |
| 2011/0022711 A1* | 1/2011 | Cohn | G06F 9/5061 709/225 |
| 2011/0023105 A1* | 1/2011 | Islam | H04L 45/52 726/11 |
| 2011/0154319 A1* | 6/2011 | Carter-Schwendler | H04L 69/167 718/1 |
| 2011/0206043 A1* | 8/2011 | Williams | H04L 1/0041 370/389 |
| 2011/0276699 A1* | 11/2011 | Pedersen | H04L 45/24 709/227 |
| 2011/0302408 A1* | 12/2011 | McDermott | H04L 63/0464 713/153 |
| 2012/0089471 A1 | 4/2012 | Comparelli | |
| 2012/0140018 A1* | 6/2012 | Pikin | H04L 65/605 348/14.02 |
| 2012/0203697 A1 | 8/2012 | Morgan et al. | |
| 2012/0203701 A1 | 8/2012 | Ayuso de Paul | |
| 2012/0209749 A1 | 8/2012 | Hammad et al. | |
| 2012/0215690 A1 | 8/2012 | Grinberg et al. | |
| 2012/0259988 A1* | 10/2012 | Erringer | H04L 67/104 709/228 |
| 2012/0290415 A1 | 11/2012 | Itwaru | |
| 2013/0024255 A1 | 1/2013 | Mittereder et al. | |
| 2013/0080618 A1* | 3/2013 | Balwani | G06F 13/00 709/224 |
| 2013/0124412 A1 | 5/2013 | Itwaru | |
| 2013/0218768 A1 | 8/2013 | Leber | |
| 2014/0006281 A1 | 1/2014 | Leber | |
| 2014/0041015 A1 | 2/2014 | Leber | |
| 2014/0073356 A1* | 3/2014 | Siomina | G01S 5/0205 455/456.2 |
| 2015/0172135 A1* | 6/2015 | Coppola | H04L 41/5019 709/203 |

OTHER PUBLICATIONS

Non-Final Office Action, dated Dec. 18, 2012, U.S. Appl. No. 13/538,872, filed Jun. 29, 2012.
Final Office Action, dated May 6, 2013, U.S. Appl. No. 13/567,844, filed Aug. 6, 2012.
Final Office Action, dated Nov. 14, 2014, U.S. Appl. No. 13/401,748, filed Feb. 21, 2012.
Notice of Allowance, dated Nov. 7, 2014, U.S. Appl. No. 13/567,844, filed Aug. 6, 2012.
Non-Final Office Action, dated Mar. 2, 2015, U.S. Appl. No. 13/401,748, filed Feb. 21, 2012.
Non-Final Office Action, dated Jan. 28, 2015, U.S. Appl. No. 13/538,872, filed Jun. 29, 2012.
Non-Final Office Action, dated Jul. 9, 2014, U.S. Appl. No. 13/401,748, filed Feb. 21, 2012.
Non-Final Office Action, dated Jun. 18, 2014, U.S. Appl. No. 13/567,844, filed Aug. 6, 2012.
Final Office Action, dated Oct. 19, 2016, U.S. Appl. No. 13/538,872, filed Jun. 29, 2012.
Final Office Action, dated Jul. 8, 2015, U.S. Appl. No. 13/401,748, filed Feb. 21, 2012.
Non-Final Office Action, dated Jan. 7, 2016, U.S. Appl. No. 13/401,748, filed Feb. 21, 2012.
Final Office Action, dated Jun. 30, 2016, U.S. Appl. No. 13/401,748, filed Feb. 21, 2012.
Non-Final Office Action, dated Aug. 13, 2015, U.S. Appl. No. 13/538,872, filed Jun. 29, 2012.
Non-Final Office Action, dated Mar. 14, 2016, U.S. Appl. No. 13/538,872, filed Jun. 29, 2012.

* cited by examiner

SYSTEMS AND METHODS FOR ESTABLISHING A VIRTUAL LOCAL AREA NETWORK

BACKGROUND

Field of the Invention

The present technology relates generally to establishing virtual local area networks, and more specifically, but not by way of limitation, to systems and methods for establishing virtual local area networks.

Background

The establishment of virtual local area networks often requires significant time and effort to configure connections between end point communications devices. Such efforts are only compounded when the end point communications devices are each connected to network connections that utilize different Internet protocols.

SUMMARY OF THE PRESENT TECHNOLOGY

According to some embodiments, the present technology may be directed to methods for establishing a virtual local area network. The methods may include: (a) determining a first data protocol for at least a first network utilized by a first communications device, via a registration server; (b) determining a second data protocol for at least a second network utilized by a second communications device, via the registration server; (c) establishing a network connection between the first communications device and the second communications device; and (d) converting a data format of data exchanged between the first and second communications devices based upon the first data protocol and the second data protocol when the first data protocol differs from the second data protocol.

According to other embodiments, the present technology may be directed to systems for establishing a virtual local area network. The systems may include: (a) a first communications device that utilizes at least a first data protocol to communicatively couple with at least a first network; (b) a second communications device that utilizes at least a second data protocol to communicatively couple with at least a second network; (c) a registration server communicatively coupled with the first and second communications devices, the registration server including a memory for storing executable instructions, the instructions being executable by a processor to: (i) determine the first data protocol utilized by the first communications device; (ii) determine the second data protocol utilized by a second communications device; (iii) establish a network connection between the first communications device and the second communications device; and (iv) convert a data format of data exchanged between the first and second communications devices based upon the first data protocol and the second data protocol when the first data protocol differs from the second data protocol.

According to additional embodiments, the present technology may be directed to systems for establishing a virtual local area network. The systems may include: (a) a first communications device that utilizes at least a first data protocol to communicatively couple with at least a first network; (b) a second communications device that utilizes at least a second data protocol to communicatively couple with at least a second network; (c) the first and second communications devices locating one another to establish a network connection when the first communications device accesses the first network connection and the second communications device accesses the second network connection; (d) the first and second communications devices determining the Internet protocol utilized by the other communications device; and (d) the first and second communications devices converting a data format of data exchanged received from the other communications device when the first data protocol differs from the second data protocol.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
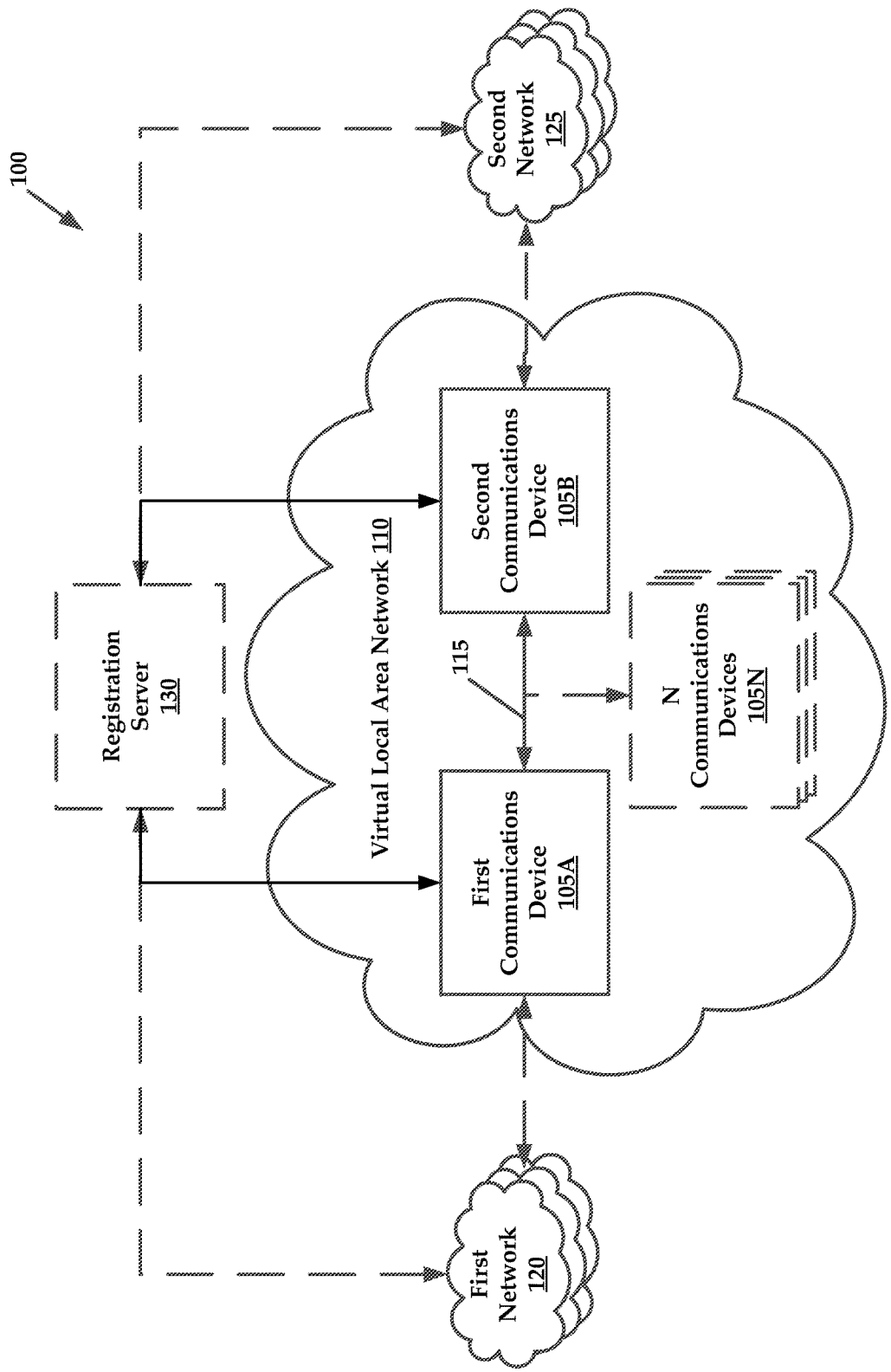
FIG. 1 is a block diagram of an exemplary system architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to systems and methods for establishing a virtual local area network. The present technology may utilize communications devices that automatically communicatively couple with one another and may communicate with one another despite utilizing network connections with different Internet or communications protocols.

For example, a first communications device that communicatively couples with at least a first network that utilizes a first data protocol (such as Internet protocol version four ("IPV4")) may establish a virtual local area network with a second communications device that communicatively couples with at least a second network that utilizes a second data protocol (such as Internet protocol version six ("IPV6")). Each of the communications devices may convert data received from the opposing communications device from a data format that conforms to the Internet protocol of the opposing communications device to a data format that conforms to the Internet protocol of the receiving communications device. In other words, the communications device that utilizes IPV6 may convert IPV4 data into IPV6, or may convert IPV6 data into IPV4 data before communicating the data to an IPV4 communications device.

The communications devices may be preconfigured to automatically couple with one another upon the communications devices accessing a network connection. The devices may access one another utilizing network address information, group or device identification information, quick response codes, bar codes, along with other suitable methods that would be known to one of ordinary skill in the art with the present disclosure before them.

The communications devices may act as a network multiplexer for managing a plurality of available networks to enhance the reliability of the network connections of the virtual local area network. Network performance may be monitored for each of the available networks to determine the latency, bandwidth, or other desired performance related characteristics of the network connections. The communications devices may select network connections on the fly to ensure that the currently selected network connection has the best performance characteristics of the available networks. This dynamic selection and updating of the network connection provides redundancy and may substantially reduce deleterious effects, such as network connection jitter, delay loss, and so forth.

Additionally, the communications devices may utilize data compression and error correction techniques to further enhance the reliability of the network connection established between the communications devices. The communications devices may compress data packets that exceed the maximum transmission unit for the Internet protocol to reduce fragmentation of data packets.

With respect to error correction, because the communications devices may establish a plurality of network connections therebetween, the communications devices may send error correction data in parallel with data packets, the error correction data being communicated on a different network connection than the data packets.

In general, the communications devices may communicatively couple with one another utilizing a plurality of network connections therebetween. This is because each communications device may have a plurality of available networks.

It will be understood that the present technology may provide for point-to-point communicative coupling between communications devices, as well as point-to-multipoint communicative coupling between pluralities of communications devices. It is also noteworthy to mention that each communications device may utilize one network or a plurality of available networks. Also, a communications device may establish a network connection with two different communications devices utilizing separate network connections.

According to some embodiments, the present technology may utilize a registration server that allows communications devices to locate one another, establish connections between communications devices for establishing the virtual local area network, and convert data received from both the communications devices to enhance bilateral data communication of the communications devices when the communications devices utilize different Internet protocols relative to one another.

These and other advantages of the present technology will be described in greater detail below with reference to the figures.

FIG. 1 illustrates an exemplary system architecture 100 for practicing aspects of the present technology. The architecture 100 may include a first communications device 105A and a second communications device 105B that are communicatively coupled with one another to form a virtual local area network 110 by establishing one or more network connections 115 therebetween. The network connection 115 may also be referred to as an "Ethernet Transport." It will be understood that the network 110 may include any number of communications devices, represented by N communications devices 105N. Therefore, the network 110 may facilitate point-to-point communications between a pair of communications devices, point-to-multipoint communications, and/or multipoint-to-multipoint communications between groups of communications devices.

The first communications device 105A may communicatively couple with one or more networks such as first network 120. This first network 120 may include any private or public communications network such as Internet, provided by an Internet service provider. In some embodiments, the first communications device 105A may communicatively couple with a plurality of available networks or dynamically select a network connection from the plurality of network connections based upon the performance of the network connections, as will be discussed in greater detail below. The second communications device 105B similarly communicatively couples with the second network 125 or a plurality of available networks.

Although not shown, the N communications devices 105N may also communicatively couple with one or more available networks.

While it is clear that the present technology may be utilized to facilitate point-to-multipoint communications and/or multipoint-to-multipoint communications, only point-to-point communications between the first and second communications devices 105A and 105B will be discussed in greater detail, for purposes of clarity. The descriptions set forth below may readily be applied to scenarios that utilize a plurality of communications devices.

According to some embodiments, the present technology may utilize a registration server 130 that facilitates communication between the first and second communications devices 105A and 105B to locate one another, establish connections between communications devices for establishing the virtual local area network, and convert data received from both the communications devices to enhance bilateral data communication of the communications devices when the communications devices utilize different Internet protocols relative to one another.

Figure 2:
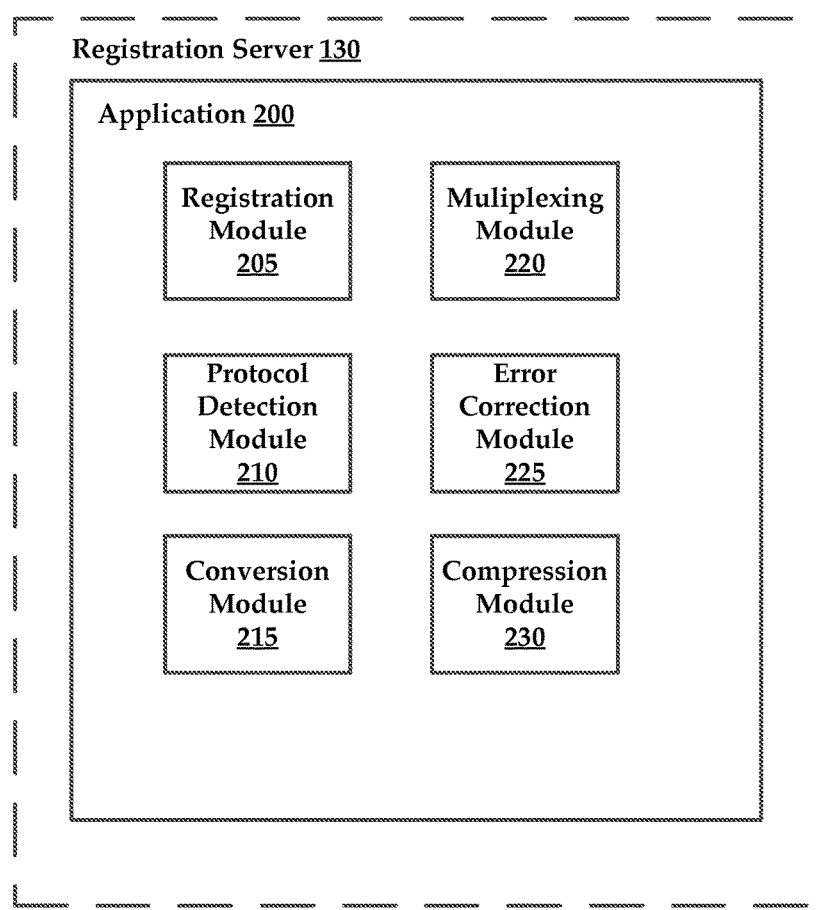
FIG. 2 is a block diagram of an exemplary application for establishing a virtual local area network.

According to some embodiments, the first and second communications devices 105A and 105B are preconfigured to establish a virtual local area network without the use of a registration server 130. In such embodiments, to establish a virtual local area network with the first and second communications devices 105A and 105B, both the first and second communications devices 105A and 105B may include a communications application 200 (FIG. 2). The communications application 200 may facilitate the establishment of one or more network connections, such as network connection 115. A more detailed description of the application will be discussed herein with reference to FIG. 2.

The phrase "virtual local area network" may be understood to include a network connection established between the first and second communications devices 105A and 105B. The network is "virtual" or transportable, because each of the first and second communications devices 105A and 105B may be physically relocated and reconnected together. In other words, the physical locations of the first and second communications devices 105A and 105B are immaterial to the performance of the network 110.

For example, the first communications device 105A may include registration information for coupling with the second communications device 105B, and vice-versa. Registration information may include, but is not limited to, a network address, an Internet protocol address, a media access control address, a serial number, a group identification, or other similar identifying information for locating a communications device on a local or wide area network.

In other embodiments, communications devices may be preconfigured using quick response codes associated with the communications devices. For example, a quick response code having identifying information for the first communications device 105A and the second communications device 105B may be obtained by a mobile device (not shown). An application on the mobile device may then be utilized to "sync" or couple the first communications device 105A with the second communications device 105B and provide such information back to each device, or alternatively, the registration server 130.

Referring now to FIG. 2, shown therein is a block diagram of an exemplary application 200 that may be utilized to establish a virtual local area network. The application 200 may generally be described as comprising a registration module 205, a protocol detection module 210, a conversion module 215, a multiplexing module 220, an error correction module 225, and a compression module 230. It is noteworthy that the application 200 may include additional modules, engines, or components, and still fall within the scope of the present technology.

As stated previously, the application 200 may reside in the memory of each of the first and second communications devices 105A and 105B, or may alternatively reside within the memory of the registration server 130. In the following description it will be understood that the application 200 may reside within and be executed by the registration server 130.

As used herein, the terms "module" and/or "engine" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured servers (e.g., registration server 130) that interact with the first and second communications devices 105A and 105B.

The registration module 205 may be executed upon the first communications device 105A contacting the registration server 130. That is, the first communications device 105A accesses the first network 120 to access the Internet (not shown) or another intermediate network, such as an intranet. The first communications device 105A generates a request to establish a virtual local area network with another communications device. That is, the first communications device 105A may "call home" to notify the registration server 130 that the first communications device 105A is available.

The request is provided to the registration server 130. The request may include information, such as a group or device identification, or other information that allows the registration server 130 to locate a network address for one or more additional communications devices.

The registration server 130 may provide the first communications device with identifying information that allows the first communications device 105A to establish a network connection with the second communications device 105B, such as an Internet protocol address, a network address, and/or a media access control address—just to name a few.

The registration module 205 may then establish a network connection 115 between the first communications device 105A and the second communications device 105B.

Next, the protocol detection module 210 is executed to determine the Internet protocol that is utilized by both the first and second communications devices 105A and 105B. For example, the protocol detection module 210 may inspect the data packet format utilized by the first communications device 105A to determine the Internet protocol associated with the first network 120. In this embodiment, it may be assumed that the first network 120 utilizes the IPV4 Internet protocol. Also, the second communications device 105B utilizes the IPV6 Internet protocol. It is noteworthy to mention that both the first and second communications devices 105A and 105B may each utilize both IPV4 and IPV6 protocols in what is known as a "dual IP" stack.

Upon determining the Internet protocols associated with the first and second communications devices 105A and 105B, the conversion module 215 may be executed to convert IPV4 data received from the first communications device 105A into IPV6 data before passing the data along to the second communications device 105B. Conversely, the conversion module 215 may convert IPV6 data received from the second communications device 105B into IPV4 data before passing the data along to the first communications device 105A.

While the above example utilizes conversions between Ethernet networks that utilize either IPV4 and/or IPV6, it will be understood that the present technology may allow for conversion into other protocols or data formats, such as Modbus, serial, universal serial bus ("USB"), RS-422, audio formats (e.g., MP3, WAV, etc.), video formats (e.g., MP4, AVI, etc.), digital-visual interface ("DVI"), Thunderbolt I/O, and so forth.

As stated above, both the first and second communications devices 105A and 105B may have a plurality (at least two or more) of available networks available. To reduce delay loss and jitter within the network 110 and increase network path optimization, the multiplexing module 220 may be executed to evaluate a plurality of networks available to the first communications device 105A. The multiplexing module 220 may compare the latency and bandwidth of the plurality of networks to one another to determine a preferred network. The preferred network may include the network that has the lowest latency and highest bandwidth of the plurality of available networks.

The multiplexing module 220 may similarly obtain a preferred network for the second communications device 105B in a similar manner.

In some embodiments, the multiplexing module 220 may be executed to automatically or continually evaluate the performance of the plurality of available network connections and switch the network connection on the fly, when the performance of the currently selected network falls below the performance of an available network. For example, the currently selected network may experience a temporary reduction in bandwidth. The multiplexing module 220 may determine that one of the available network connections has a greater bandwidth than that the currently selected network. The multiplexing module 220 may automatically and transparently switch to the available network with the highest bandwidth.

Such methods may increase the redundancy and performance of the network 110, ensuring that temporary fluctuations in network performance due to throttling, network component failure, or other common flaws inherent to networks only minimally affect the network 110.

In some embodiments, the multiplexing module 220 may establish a plurality of network connections (not shown) between the first communications device 105A and the second communications device 105B. The error correction module 225 may utilize one or more of these additional network connections to send error correction codes in parallel with data being communicated between the first and second communications devices 105A and 105B. The parallel communication of error codes on a different network connection than the network connection utilized to communicate the target data may increase the efficiency and reliability of error correction within the application 200. That is, the error codes may be transmitted independently from the data to which they correspond, reducing the likelihood that the error codes may be corrupted or modified during communication. This may be particularly advantageous when the size of the data packets exceed the maximum transmission unit ("MTU") size for the Internet protocol of the network, leading to packet fragmentation.

To reduce the need to fragment data packets, the compression module 230 may be executed to compress portions of the data packet into a size that is less than the MTU of the network. Prior to compression, the compression module 230 may determine the MTU of the network by determining the data format of a data packet. For example, if the data packet utilizes a 32 bit address block, it can be inferred that the Internet protocol of the network is IPV4. Moreover, the compression module 230 may utilize techniques, such as path MTU discovery, to determine the actual MTU of a network path or connection.

According to some embodiments, the first and second communications devices 105A and 105B may include many of the components of the exemplary computing system 500, which will be described in greater detail with reference for FIG. 5. The devices 105A and 105B may also include a user interface, such as a touchscreen or LED display that provides status information (such as network connectivity, reliability and so forth).

As stated above, both the first and second communications devices 105A and 105B may be preconfigured to connect with one another upon the first communications device 105A accessing the first network 120 and the second communications device 105B accessing the second network 125. This configuration may be referred to as a static configuration, as address information or other operational information for each device 105A and 105B may be preloaded into the memory of each device.

In some embodiments, even the statically preconfigured devices may alternatively communicate with the registration server or another proxy when attempts to communicate with other communications devices are unsuccessful.

With respect to the following example, it will be understood that the communications devices 105A and 105B are statically preconfigured to communicatively couple with one another. In operation, the first communications device 105A is coupled with the first network 120, and optionally, additional networks if available. At another location, the second communications device 105B is coupled with the second network 125, and optionally, additional networks if available. Utilizing the first network 120, the first communications device 105A attempts to locate the second communications device 105B, utilizing network address information or other information that specifies the location of the second communications device 105B. Upon confirming contact with the second communications device 105B, the two devices 105A and 105B may exchange any necessary security protocols to establish one or more network connections therebetween.

It will be understood that in some cases, the devices 105A and 105B may be positioned behind firewalls. The devices 105A and 105B may be preconfigured with authentication information for penetrating firewalls and accessing one another to establish a network connection therebetween.

Additionally, each of the devices 105A and 105B may be configured to convert data packets from one data format into one or more different data formats, either as they are received, or before they are communicated to other communications devices within the virtual local area network 110.

Figure 3:
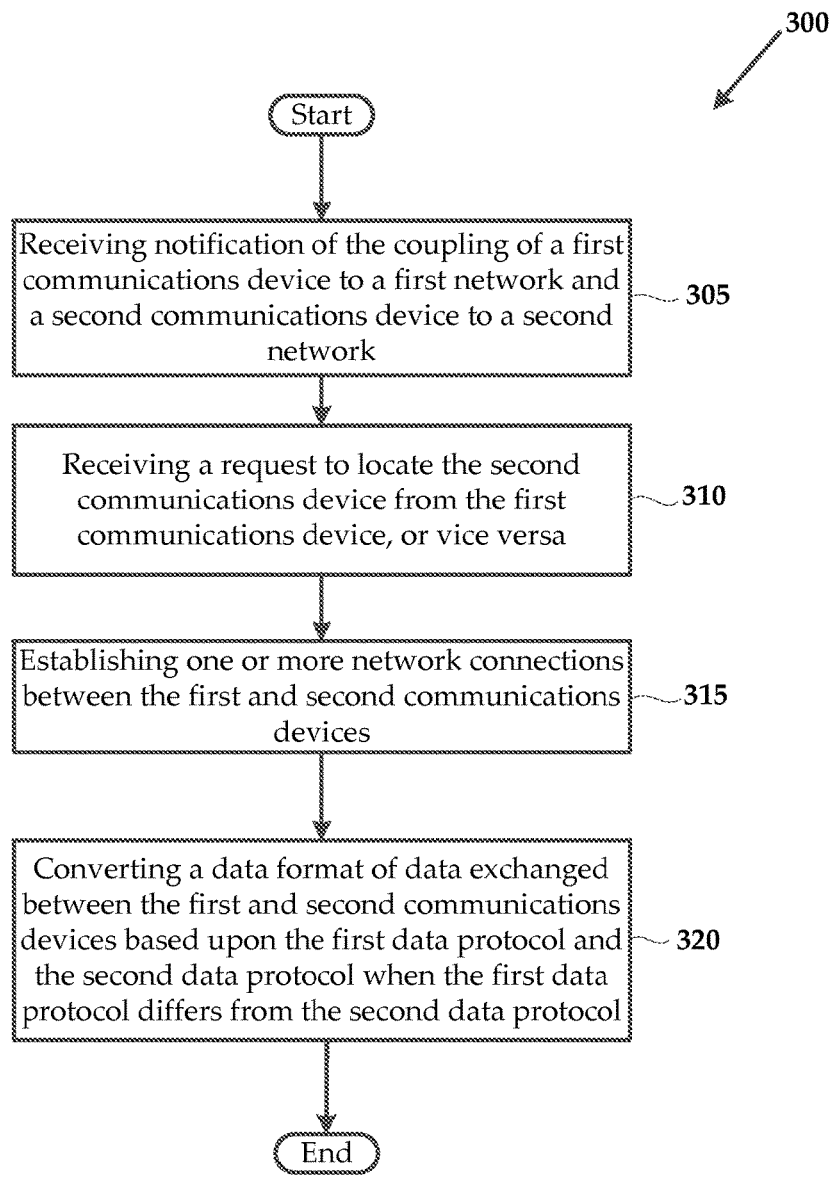
FIG. 3 illustrates a flowchart of an exemplary method for establishing a virtual local area network.

Referring now to FIG. 3, a flowchart of an exemplary method 300 for establishing a virtual local area network is shown. The method 300 may include the step 305 of receiving notification of the coupling of a first communications device to a first network and a second communications device to a second network. It is noteworthy to mention that the first network may utilize a first data protocol and the second network may utilize a second data protocol.

Next, the method 300 may include the step 310 of a registration server receiving a request to locate the second communications device from the first communications device, or vice versa. It is noteworthy to mention that the first and second communications devices may include preconfigured location information that allows the devices to locate one another without utilizing the registration server.

After obtaining the locations of each of the devices, the method 300 may include a step 315 of a registration server establishing one or more network connections between the first and second communications devices.

Upon the communication of data from one device to another, the method 300 may include the step 320 of converting a data format of data exchanged between the first and second communications devices based upon the first data protocol and the second data protocol when the first data protocol differs from the second data protocol.

Figure 4:
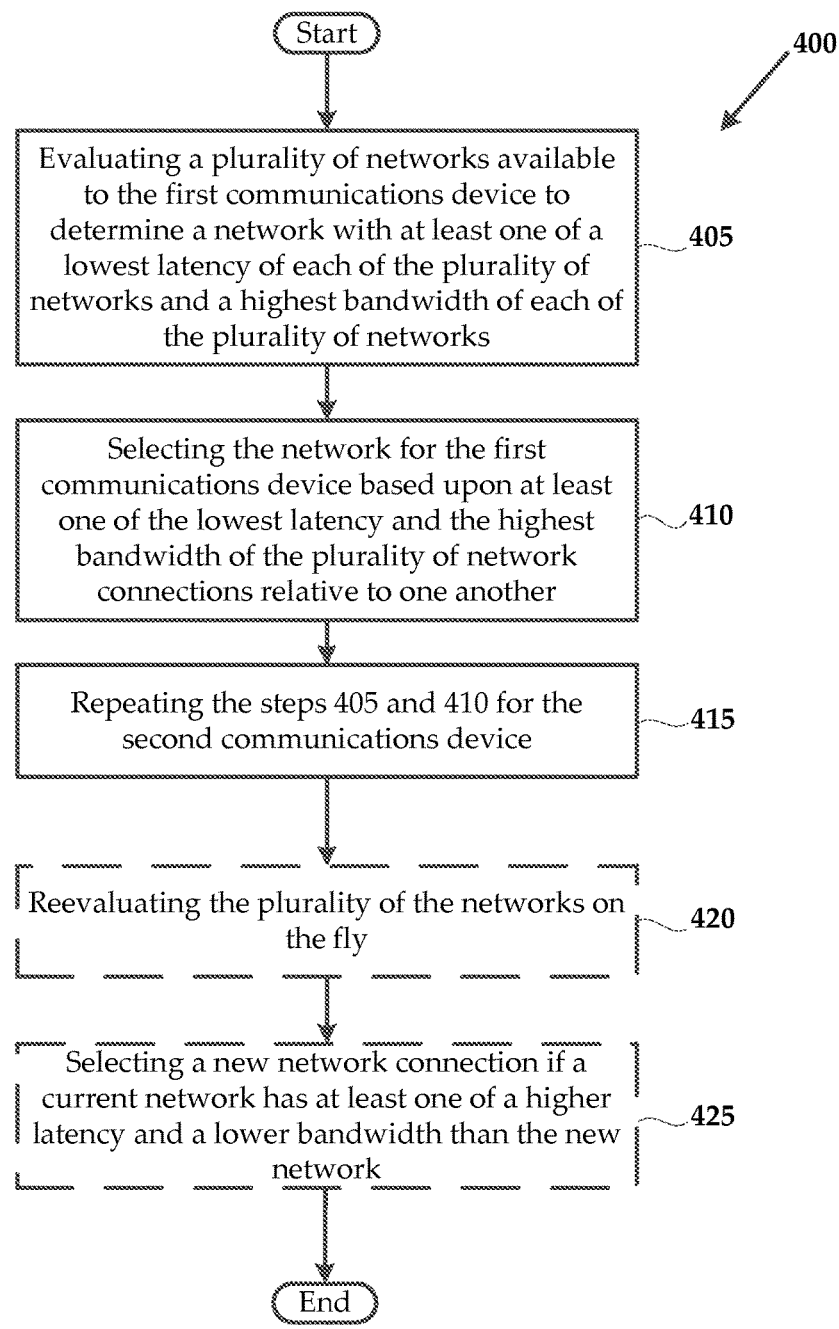
FIG. 4 illustrates a flowchart of an exemplary method for optimizing a network connection.

FIG. 4 illustrates a flowchart of an exemplary method 400 for optimizing a network connection between a first and second communications devices. The method may include a step 405 of evaluating a plurality of networks available to the first communications device to determine a network with at least one of a lowest latency of each of the plurality of networks and a highest bandwidth of each of the plurality of networks. It will be understood that each of these networks may utilize or employ a different communications protocol.

Next, the method 400 may include a step 410 of selecting the network for the first communications device based upon at least one of the lowest latency and the highest bandwidth of the plurality of network connections relative to one another.

After selecting the network for the first communications device, the method 400 may include repeating the steps 405 and 410 for the second communications device in step 415.

Optionally, the method may include a step 420 of reevaluating the plurality of the networks on the fly, along with a step 425 of selecting a new network connection if a current network has at least one of a higher latency and a lower bandwidth than the new network.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Figure 5:
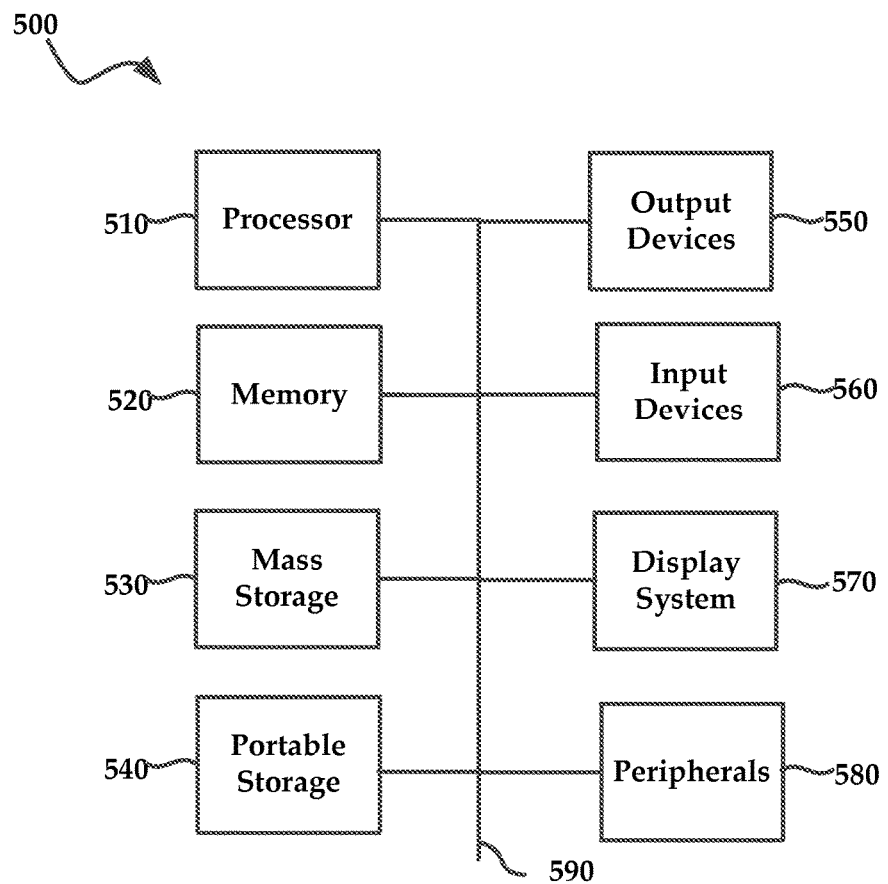
FIG. 5 illustrates an exemplary computing system that may be used to implement embodiments according to the present technology.

FIG. 5 illustrates an exemplary computing system 500 that may be used to implement an embodiment of the present technology. The computing system 500 of FIG. 5 may be implemented in the contexts of the likes of computing systems, networks, servers, or combinations thereof. The computing system 500 of FIG. 5 includes one or more processors 510 and main memory 520. Main memory 520 stores, in part, instructions and data for execution by processor 510. Main memory 520 may store the executable code when in operation. The computing system 500 of FIG. 5 further includes a mass storage device 530, portable storage medium drive(s) 540, output devices 550, user input devices 560, a display system 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the computing system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripheral device(s) 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for establishing a virtual local area network, the method comprising:

establishing, by a multiplexing module of a registration server, a plurality of network connections between a first communications device coupled to a first network and a second communications device coupled to a second network, wherein the first communications device and the second communications device are preconfigured to locate one another upon both the first communicatinos device accessing the first network and the second communications device accessing the second network, wherein the first communications device and the second communications device form a virtual local area network;

inspecting, by the registration server, a first data packet format utilized by the first communications device to determine a first data protocol associated with the first network;

inspecting, by the registration server, a second data packet format utilized by the second communications device to determine a second data protocol associated with the second network;

converting, by the first and second communications devices, a data format of data exchanged between the first and second communications devices based upon the first data protocol and the second data protocol when the first data protocol differs from the second data protocol;

evaluating, by the registration server, the plurality of network connections established between the first communications device and the second communications device to determine a network connection with a lowest latency of each of the plurality of network connections and a network connection with a highest bandwidth of each of the plurality of network connections;

dynamically selecting, by the registration server, a network connection of the plurality of network connections for the first communications device based on the lowest latency and the highest bandwidth of the plurality of network connections relative to one another;

dynamically selecting, by the registration server, a network connection of the plurality of network connections for the second communications device based on the lowest latency and the highest bandwidth of the plurality of network connections relative to one another; and sending, by an error correction module using the multiplexing module of the registration server, error correction codes in parallel with data being communicated between the first communications device and the second communications device, the sending of the error correction codes being on a different network connection than a network connection used to communicate target data thereby increasing efficiency and reliability of error correction and reducing likelihood that the error correction codes are corrupted or modified during communication.

2. The method according to claim 1, wherein the first data protocol comprises Internet protocol version four ("IPV4") and the second data protocol comprises Internet protocol version six ("IPV6").

3. The method according to claim 1, further comprising:
reevaluating the plurality of the network connections continuously; and
selecting a new network connection if a current network connection has a higher latency and a lower bandwidth than the new network connection.

4. The method according to claim 1, wherein converting further comprises at least one of error correcting and encrypting data exchanged between the first and second communications devices.

5. The method according to claim 1, further comprising:
determining a size for a maximum transmission unit for at least one of the first data protocol and the second data protocol; and
compressing data exchanged between the first and second communications devices when the data exceeds the size of the maximum transmission unit.

6. The method according to claim 1, wherein establishing includes the first communications device automatically determining a network address for the second communications device when the first communications device accesses the first network.

7. A non-transitory computer readable medium having recorded thereon a program, the program when executed performs a method of establishing a virtual local area network, the method comprising:
determining a first data protocol for network addressing for at least a first network utilized by a first communications device, via a multiplexing module of a registration server;

determining a second data protocol for network addressing for at least a second network utilized by a second communications device, via the registration server, wherein the first communications device and the second communications device are preconfigured to locate one another upon both the first communications device accessing the first network and the second communications device accessing the second network;

establishing a plurality of network connections between the first communications device and the second communications device, the first communications device and the second communications device forming a virtual local area network;

converting, by the first and second communications devices, a data format of data exchanged between the first and second communications devices based upon the first data protocol and the second data protocol when the first data protocol differs from the second data protocol; and utilizing at least one of the plurality of network connections between the first communications device and the second communications device for sending error correction codes in parallel with data being communicated between the first and second communications devices on another one of the plurality of network connection, the sending of the error correction codes being on a different network connection than a network connection used to communicate the data being communicated between the first and second communications devices thereby increasing efficiency and reliability of error correction and reducing likelihood that the error correction codes are corrupted or modified during communication.

8. The non-transitory computer readable medium according to claim 7, further comprising:
determining a size for a maximum transmission unit for at least one of the first data protocol and the second data protocol; and
compressing data exchanged between the first and second communications devices when the data exceeds the size of the maximum transmission unit.

9. The non-transitory computer readable medium according to claim 7, wherein the first communications device further:
evaluates a plurality of network connections available to the first communications device to determine a preferred network of the plurality of network connections with at least one of:
a lowest latency of each of the plurality of network connections; and
a highest bandwidth of each of the plurality of network connections;
selects a network for the first communications device based upon at least one of the lowest latency and the highest bandwidth of the plurality of network connections relative to one another; and
evaluates and selects a network for the second communications device.

* * * * *